United States Patent [19]
Porterfield

[11] 3,717,127
[45] Feb. 20, 1973

[54] ANIMAL FEEDING DEVICE
[76] Inventor: D. G. Porterfield, 1025 Glenhaven, Abilene, Tex.
[22] Filed: Feb. 18, 1971
[21] Appl. No.: 116,371

[52] U.S. Cl. .................................119/52 B, 119/56 A
[51] Int. Cl. ..............................................A01k 5/00
[58] Field of Search .......119/52 B, 56 A; 214/17 CB; 239/675

[56] References Cited

UNITED STATES PATENTS

| | | |
|---|---|---|
| 2,758,842 | 8/1956 | Burroff............................239/675 X |
| 3,478,970 | 11/1969 | Siwersson et al. ................239/675 X |
| 2,735,400 | 2/1956 | Stubbs............................119/52 B X |
| 2,885,191 | 5/1959 | Hansen............................119/52 B UX |

Primary Examiner—Hugh R. Chamblee
Attorney—Richards, Harris & Hubbard

[57] ABSTRACT

A vertical auger delivers animal feed pellets from a hopper to a rotating feed distributing chute located at the top of the hopper. The auger and rotating chute are periodically energized for a predetermined length of time, distributing a corresponding amount of feed. The rotating chute, which is directed toward a given point for a preselected trajectory throws the feed by centrifical force in a narrow band along the path of a circle about the hopper - either onto firm ground, turf, or into an annularly disposed feed trough which forms a ring about the hopper.

12 Claims, 8 Drawing Figures

INVENTOR:
D. G. PORTERFIELD

ATTORNEYS

INVENTOR:
D. G. PORTERFIELD

ANIMAL FEEDING DEVICE

BACKGROUND OF THE INVENTION

1. Field of the Invention

The invention relates to periodically actuated animal feeding devices, more particularly, to an animal feeding device in which animal food is periodically distributed by throwing it from a hopper in a narrow band along the path of a circle either onto firm ground, turf or into a circular trough.

2. History of the Prior Art

In the ranching industry, it is desirable at certain times of the year to feed cattle a supplementary diet in addition to the grass which they normally eat. During these times of the year, it is generally preferable to only feed the cattle from 1 to 3 pounds per day each of the supplement. Any less will not accomplish the intended nutritional purpose and any more is nutritionally wasted and is an unnecessary expense. Supplemental feeding has, in the past, generally required that someone visit the location of the cattle and there see that the proper quantity of feed is distributed. Because of the time required to make this daily visit, it may often cost more to distribute the feed than the value of the feed itself.

Many attempts have been made to limit the time and attention required for supplemental feeding of cattle. One of the oldest methods, still used, is the addition of salt to the supplement so that the animals can eat only as much supplement as they can tolerate salt. Quantities of salt added to supplemental feed may be unhealthy for a few animals and result in a variation in the quantities of supplemental feed consumed by different animals because of a difference in ability to tolerate salt. Salt addition also results in an added 20 to 30 percent increase in feed costs. Another such technique of supplemental feeding is that of using range blocks which comprise tightly compressed cattle feed with a quantity of urea and salt to make it less palatable to the cattle. Because of the hardness and density of the material, it is physically difficult for the cattle to eat more than a small amount at a time. Also, because of the salt and urea mixed with the feed, it is less appetizing and the cattle do not desire to eat more than a limited portion. A range block is placed near the cattle and a limited but variable amount is consumed each day. Since the blocks are relatively large, the supply need not be replenished as often as with conventional supplementary feed.

Another technique which is being used for the supplemental feeding of cattle is that of liquid feed made from molasses. The molasses, like the range blocks, is also mixed with a quantity of urea to make it less appetizing to the cattle and is distributed from a large tank upon which has been mounted a tongue wheel which dips into the material. The only way in which the cattle can get the feed is by licking the tongue wheel to rotate it into the food and bring it up in limited quantities onto the wheel. Because a large tank is used, the supply need only be replenished occasionally. By far the most common method of supplemental feeding in the Southwestern U.S. is the use of range pellets which are distributed daily by hand on the ground or in troughs.

The present invention seeks to solve the problem of distributing a limited amount of palatable food supplement with a food dispensing device which is operated periodically to distribute a preselected amount during each cycle of operation. While periodically operated conveyor belts and moving hopper type feeders are known, these have generally been employed to feed a full food ration to animals such as dairy cattle or feed lot cattle. These cattle differ from range cattle in that they get their entire daily food ration from the dispensing mechanism rather than only a small supplement. For this reason, the automatic bulk feeding devices of the prior art are impractical to periodically distribute a small amount of feed for a large number of range cattle.

The invention distributes the animal food by projecting it through the air from a food supply to a distant point either on firm ground, turf, or into a trough. While periodically actuated food scatterers are known, these devices randomly scatter the food, such as birdseed, upon the surface of the ground for the animals to pick up. While this type of food distribution is adequate for the birds and wildlife, it is not satisfactory for domestic livestock where many animals arrive at the instant of feeding and would trample the randomly scattered feed in their search. When it is placed in a relatively narrow band the livestock stand and eat much as if it were troughed, which it may in fact be, if desired. For these reasons, it is very desirable to distribute food in a preselected pattern such as a circular ring around the storage area so that the animals know where to find the food and it is less likely to get lost or destroyed.

SUMMARY OF THE INVENTION

The invention relates to a timed animal feeder in which food is delivered by a vertical auger and distributed by a rotating chute into a circular band either on ground or in a trough.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
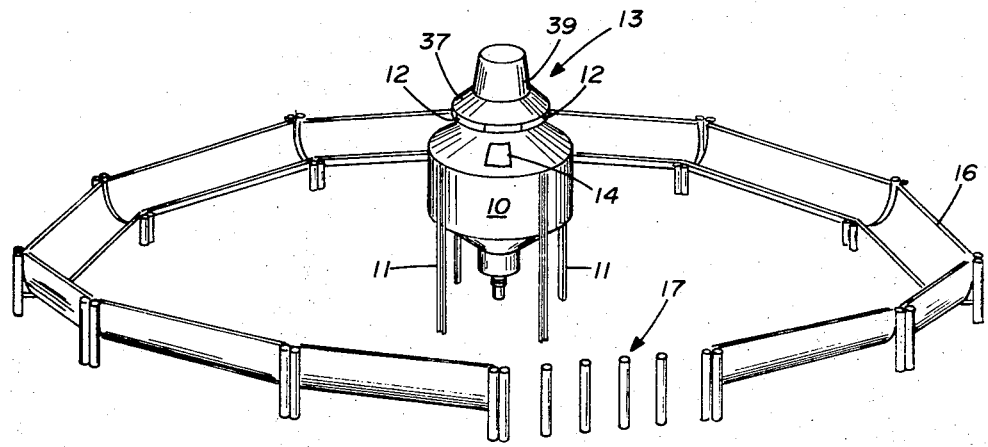
FIG. 1 is a perspective view of an animal feeder constructed in accordance with the invention.

Referring to FIG. 1, the livestock feeding apparatus includes a cylindrical hopper 10 supported on a plurality of vertically extending legs. The hopper has an enclosed top surface with a fill door 14 formed therein. The hopper 10 also has a plurality of rotating feed distribution chutes 12 mounted at the top within a housing 13. Cattle feed is delivered from the hopper to the rotating chutes 12 and, as the chutes rotate, the feed is directed down the chutes through the air and lands in a trough array 16 which is circularly disposed about the hopper. The circular trough 16 is preferably higher on the outside edge than the inside to better receive the feed thrown by the chutes 12. Larger cattle being fed can reach over the higher outside edge and eat from the trough while the smaller cattle and calves cannot and must go inside the trough ring to the lower edge to eat. For this purpose a creep gate 17 is included in the trough ring to allow the small cattle to pass through and prevent the larger cattle from doing so. The creep gate 17 includes a plurality of vertically extending pipes spaced from one another a small enough distance so that only the smaller animals are allowed passage.

Figure 2:
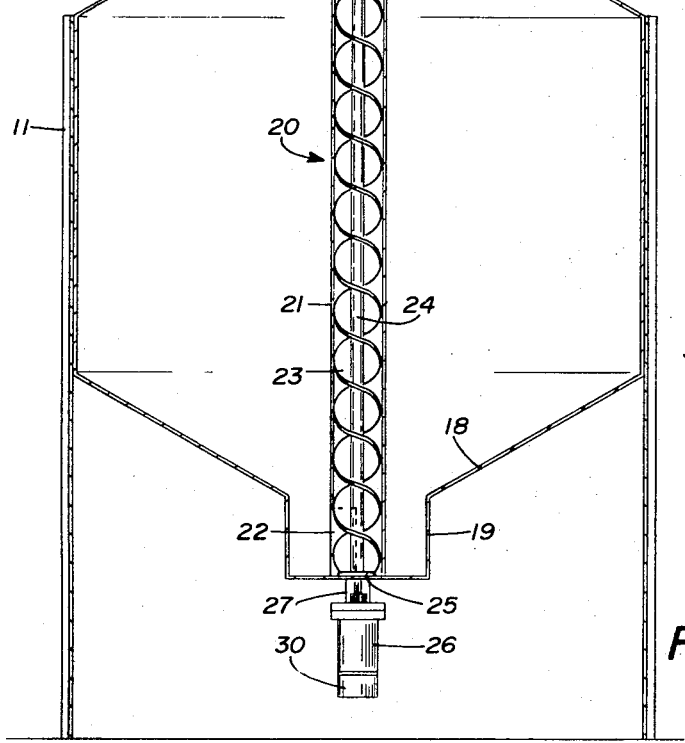
FIG. 2 is a vertical cross section view of the animal feeder shown in FIG. 1.

Referring now to FIG. 2, a cross section view of the feeder is shown. The bottom surface 18 of the hopper 10 is conically shaped to cause the pellets to flow toward the lower center section 19. Any type of livestock pellets can be distributed by the feeder as long as they have a tendency to "flow" and have sufficient size and density to follow the desired trajectory. For example, livestock feed pellets or cubes may be cylindrical and from 1 to 3 inches long and from ½ to 1 inch in diameter. These pellets have been found to roll or flow very well over one another and are the most common type presently used as supplement. Other types of feed such as "pelletized" hay or square pellets can also be used.

The feeder includes a vertical auger 20 extending from the center section 19 of the hopper bottom 18 into the housing 13 of the rotating chutes. The auger trough 21 includes a bottom feed opening 22 which extend approximately half way around the trough to allow a sufficient amount of feed pellets to enter the trough or the auger and be carried upwardly by the auger blades 23 as the auger shaft 24 is rotated. The lower end of the auger shaft 24 extends through a bearing 25 and is attached to an electric motor 26. The motor is periodically energized through a timer 30 and a gear reduction mechanism 27. Although 110 volt A.C. motor is generally preferred, it is to be understood that many other driving sources such as a battery actuated motor, either with or without a wind charging arrangement, could be employed.

The auger 20 passes through the top of the hopper and the auger shaft 24 is supported at its lower end by a first bearing 25 and at its upper end by a second bearing 28. The second bearing 28 is mounted on the top of an auger support plate 29 which is attached to the top of the hopper by a plurality of support pillars 31. The top end of the auger shaft 24 extends through the bearing 28 and out through the top of the support plate 29 and is there fixed to the inside of a ratchet mechanism 32. The outside of the ratchet 32 is mounted to a chute support plate 33 which has a plurality of chute support arms 34 extending downwardly therefrom.

Figure 3A:
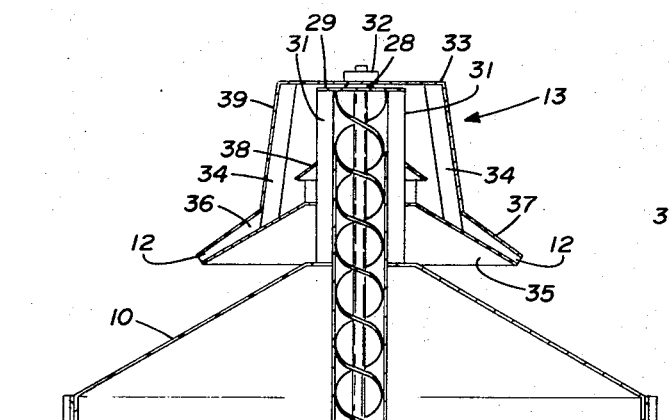
FIG. 3A is a perspective view of the rotating feed distributing chute of the animal feeder shown in FIG. 1.
Figure 3A:
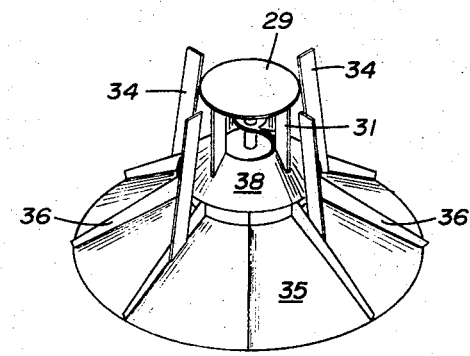
Figure 3B:
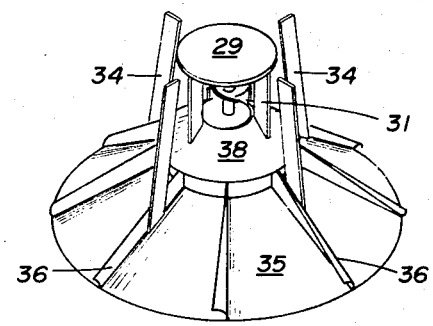
FIG. 3B is a perspective view of an alternate embodiment of a rotating directional feed distribution chute constructed in accordance with the invention.
Figure 4:
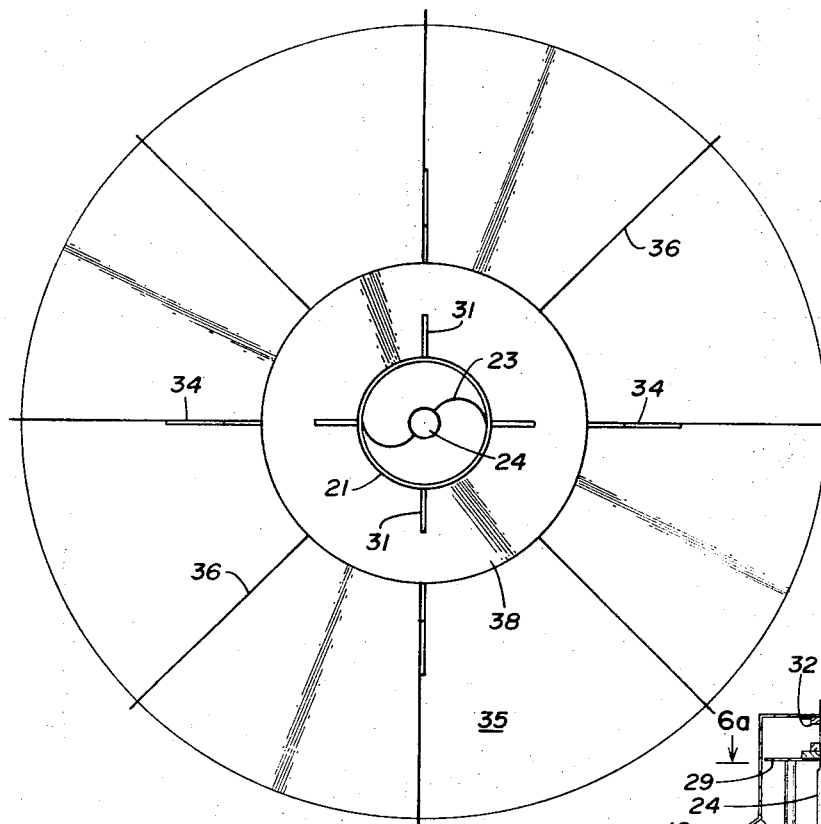
FIG. 4 is a top view of the rotating feed distributing chute of FIG. 3A.

As shown in FIGS. 2, 3A and 4, the directional, circular rotating feed distribution chutes 12 are attached to and supported by the chute support arms 34. The chutes comprise a lower, generally conical plate 35 formed of sheet metal which is attached to the chute support arms 34. A plurality of wedge shaped fins 36 extend vertically from the lower plate 35 and divide the plate into a plurality of sections. A cover plate 37 also of generally conical shape is placed on top of the fins 36 to form a plurality of downwardly tapering feed distribution chutes 12 which are open at both their upper and lower ends. As the food is delivered out the open upper end of the auger trough, it falls onto a conical feed deflection plate 38 which directs it into the upper ends of the chute as they rotate. Each one of the chutes 12 is vertically wider at its upper ends than at the lower end to concentrate the distribution of food out the lower end in a certain trajectory and, preferably, throw the food toward a preselected site in the same line as the angle of the chute to the ground. A rain shield 39 covers the outer portion of the mechanism so that the entire works are enclosed and protected from the elements. The conical cover plate 37 of the feed distribution chute may not be essential to gain directional effect if the vertical fins are modified by curvature of the upper edge as shown in FIG. 3B, to obtain this effect. The cover plate also serves 3B to "weather proof" the device.

Figure 6:
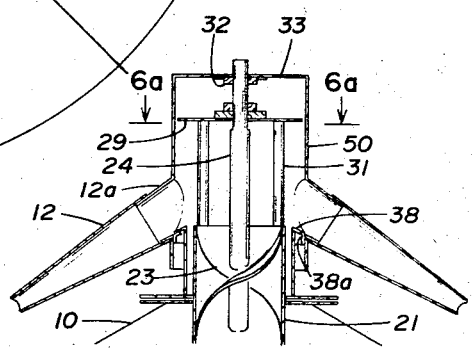
FIG. 6 is a vertical cross section of a further embodiment of a rotating directional feed distribution chute constructed in accordance with the invention.
Figure 5:
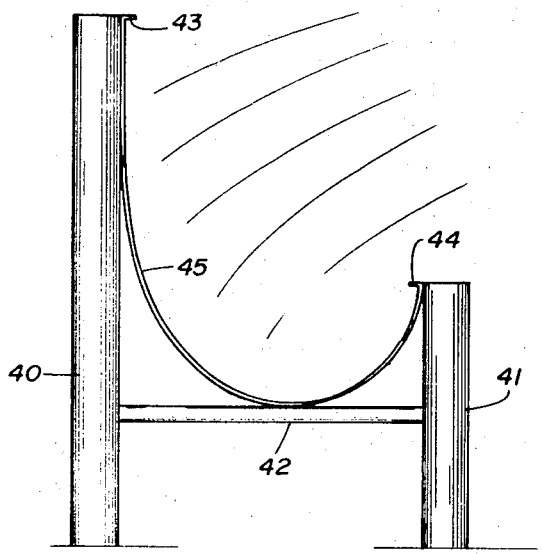
FIG. 5 is a side view of the feed receiving trough used in connection with the invention.
Figure 6A:
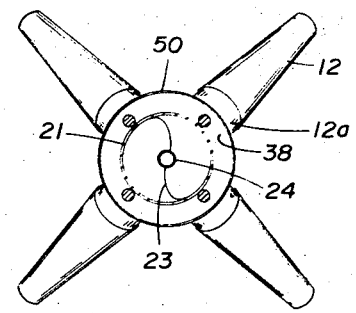
FIG. 6A is a top view of the rotating feed distribution chute of FIG. 6.

A further, and in some instances preferred, embodiment of the invention is shown in FIGS. 6 and 6A. As shown in FIG. 6, the ratchet 32 is mounted to the chute support plate 33 which is attached to a spinner suspension cylinder 50. The directional, circular rotating feed distribution chutes 12 are attached to and supported by the spinner suspension cylinder 50. The chutes 12 comprise conical tubes attached at their larger ends to the rotating suspension cylinder 50 by tubular chute bases 12A located at spaced openings in the cylinder. The conically tubular chutes are open at upper and lower ends and are directed at an angle toward the ground. As the feed is delivered out the open upper end of the auger trough, it falls onto a conical feed deflection plate 38 which directs it onto a rotating deflector shield 38A and into the upper ends of the chutes 12 as they rotate. The conically tubular chutes 12 are smaller at the lower and angled downwardly to concentrate the feed in a certain trajectory and send it toward a preselected site determined by the angle of the chute to the ground. A top view of the embodiment of FIG. 6 is shown in FIG. 6A. Referring now to FIG. 5, the trough ring 16 shown in FIG. 1, is comprised of a plurality of straight sections of trough each of which includes a tall post 40 and a short post 41 at each end connected by a reinforcing member 42. The tall posts at each end are joined by an upper angle iron 43 and the short posts are joined by a lower angle iron 44. The bottom of each trough section is formed by a length of sheet metal 45 connected between the upper and lower sections of angle iron and bowed downwardly at the bottom and attached to the reinforcing members 42. The structures of the trough sections is such that if feed is thrown toward the trough, it will readily clear the lower inside edge of the trough and be deflected by the outside wall. The angle iron pieces 43 and 44 serve to prevent moving feed from following the curvature of the sheet metal 45 and escaping. The inherent small gaps between the straight sections of trough forming the ring permit rain water to escape.

In operation, the timer 30 periodically energizes the motor 26 to rotate the auger blades 23 and draw feed pellets into the bottom of the auger trough 21 through the opening 22. The rotating of the auger blades 23 transports the feed up the trough 21 and when the pellets reach the top and they are allowed to fall from the open end of the auger trough 21 onto the feed deflection plate 38 into the upper ends of the feed distribution chutes 12. Rotation of the auger shaft 24 also serves to rotate the feed distribution chutes 12 through the ratchet mechanism 37. During rotation of the chutes 12, the feed tends to be accelerated by a centrifical force as it passes along the chute. The feed is then ejected out the end of the chute. The angle of the chutes to the ground is so arranged that as the food passes from the lower end of the chute, it is thrown in a fairly straight trajectory into the troughs 16 as shown in FIG. 1. The angle which the rotating chute forms with the ground determines the diameter of the circle of feed. The width of the band in which it is distributed is also dependent on the pellet characteristics (shape and density) as well as the speed of rotation of the chute.

The rachet mechanism 32 enables the distribution chutes 12 to continue to rotate and exhaust the food contained therein even after the auger has stopped rotating and delivering new quantities of pellets to the upper ends of the chutes. Although the feeder has been described wherein the distribution chutes rotate at the same speed as the auger, it is to be understood that the auger shaft 24 could be connected to the chute support plate 33 through a gear mechanism (not shown) which could be used to obtain any speed of rotation desired. Any relative value between the speed rotation of the auger and the speed of rotating the chute could be selected which would adequately distribute the feed required. It is also to be understood that separate motors could be employed for rotating the auger and rotating the feed distribution chutes.

It is to be also understood that the troughs 16 are not absolutely essential and that in their absence, food will be distributed in a fairly uniform ring-like pattern around the exterior of the bin. This ring pattern concentrates the food in one area so that it is much more likely to be consumed by the cattle rather than to be trampled or destroyed or overlooked by them.

Having described the invention in connection with certain specific embodiments thereof, it is to be understood that further modifications may now suggest themselves to those skilled in the art and it is intended to cover such modification as fall within the scope of the appended claims.

What is claimed is:

1. A device for periodically distributing a preselected amount of pelletized feed for livestock, comprising:
    a hopper having an enclosed top surface and a funnel shaped bottom surface for storing feed to be distributed;
    a vertically extending conveyor having a stationary cylindrical housing containing an auger screw, said housing having an intake opening at the apex of said funnel shaped bottom surface and a discharge opening above the top surface of said hopper;
    a plurality of feed distribution chutes rotatably mounted above the top surface of said hopper to receive feed from the discharge opening in said conveyor, said feed distribution chutes having a bottom wall angled downwardly toward the ground and terminating at a lower discharge end, each chute having at least one surface converging from said feed end toward said discharge end; and
    means for periodically concurrently rotating said auger screw and said feed distribution chutes to transport feed from within the hopper to said distribution chute which concentrates the feed to deliver it in relatively undamaged condition at a predetermined trajectory and in an annular pattern surrounding said hopper thereby permitting animal recovery of the feed.

2. A device for periodically distributing a preselected amount of feed for livestock as set forth in claim 1 wherein said feed distribution chutes include:
    a lower conical plate rotatably mounted above the top surface of the hopper and below the discharge opening in the auger having a surface which is angled toward the ground in the direction of the location spaced from the hopper to which the feed is to be distributed;
    a plurality of upstanding wedge shaped fins mounted to said lower conical plate with the narrow end of said fins adjacent the lower edge of said lower plate; and
    a conical cover plate mounted to the upper edges of said upstanding wedge shaped fins to form a plurality of enclosed chutes each of which are vertically larger at the upper end adjacent the discharge chute of the auger than at the lower end to control the flow of feed through the chutes.

3. A device for periodically distributing a preselected amount of feed for livestock as set forth in claim 2 which also includes:
    a conical feed deflection plate mounted between the discharge end of the auger and the upper ends of said chute to guide feed emerging from the auger into the rotating chutes.

4. A device for periodically distributing a preselected amount of feed for livestock as set for in claim 1 wherein said feed distribution chutes are fixed to the upper end of said auger to be rotated thereby.

5. A device for periodically distributing a preselected amount of feed for livestock as set forth in claim 4 wherein said feed distribution chutes are fixed to the upper end of said auger by a ratchet mechanism to allow further rotation of the chutes after the auger has stopped and distribute the feed still contained therein.

6. A device for periodically distributing a preselected amount of feed for livestock as set forth in claim 2 which also includes:
    a chute support plate mounted to the end of said auger to be rotated thereby; and
    a plurality of chute support arms attached at one end to said chute support plate and at the other end to said lower conical plate tO rotate the feed distribution chutes with said auger.

7. A device for periodically distributing a preselected amount of feed for livestock as set forth in claim 6 wherein said chute support arms are enclosed by a conical shield having its upper edge attached to said chute support plate and its lower edge attached to said conical cover plate to completely enclose the upper end of said chutes and the discharge opening of said auger and protect the feed from the elements.

8. A device for periodically distributing a preselected amount of feed for livestock as set forth in claim 1 which also includes:
an annular trough array located on the ground spaced from and surrounding said hopper at the preselected location to which feed is to be distributed.

9. A device for periodically distributing a preselected amount of feed for livestock as set forth in claim 1 wherein said feed distribution chutes are tubular and wherein the axis of said tubes are angled toward the ground.

10. A device for periodically distributing a preselected amount of feed for livestock as set forth in claim 9 wherein said tubular chutes are conical with the larger end nearer said auger.

11. A cattle feeding system for delivery of pelletized animal food comprising:
a hopper having an enclosed top surface and a funnel shaped bottom surface for storing food;
a vertically extending conveyor having a stationary cylindrical housing containing an auger screw, said housing having an intake opening at the apex of said funnel shaped bottom surface and a discharge opening above the top surface of said hopper;
a plurality of feed distributions chutes rotatably mounted above the top surface of said hopper to receive feed from the discharge opening in said conveyor, said feed distribution chutes having a bottom wall angled downwardly toward the ground having a lower discharge end and each chute having at least one surface tapering toward said discharge end;
means for periodically concurrently rotating said auger and said feed distribution chutes to transport feed from within the hopper to said distribution chutes which concentrates the feed to deliver it at a predetermined trajectory and in an annular pattern surrounding said hopper;
an annular trough array located on the ground spaced from and surrounding the hopper at the location to which the feed is distributed; and
selective gate means in said annular trough adapted to permit animals below a predetermined size to enter into the interior of said trough.

12. The system of Claim 11 wherein said selective gate means comprises a series of vertically extending pipes spaced apart predetermined distances in an opening in said trough and said trough is configured with the exterior side wall away from the hopper vertically higher than the opposite interior wall.

* * * * *